(12) United States Patent
Campbell

(10) Patent No.: US 8,269,399 B2
(45) Date of Patent: Sep. 18, 2012

(54) SYSTEMS AND APPARATUS FOR HARVESTING ENERGY

(75) Inventor: Lam Campbell, Minden, NV (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/779,383

(22) Filed: May 13, 2010

(65) Prior Publication Data
US 2011/0278986 A1 Nov. 17, 2011

(51) Int. Cl.
H01L 41/08 (2006.01)
(52) U.S. Cl. .......................... 310/329; 310/339; 310/319
(58) Field of Classification Search .................. 310/329, 310/339, 319
See application file for complete search history.

(56) References Cited

U.S. PATENT DOCUMENTS

| | | | | | |
|---|---|---|---|---|---|
| 3,624,264 | A | * | 11/1971 | Lazarus | 84/730 |
| 4,327,359 | A | * | 4/1982 | Kurtz | 340/566 |
| 5,668,744 | A | * | 9/1997 | Varadan et al. | 700/280 |
| 5,801,475 | A | * | 9/1998 | Kimura | 310/319 |
| 6,304,176 | B1 | * | 10/2001 | Discenzo | 340/539.26 |
| 6,984,902 | B1 | | 1/2006 | Huang et al. | |
| 7,081,693 | B2 | * | 7/2006 | Hamel et al. | 307/151 |
| 7,170,201 | B2 | | 1/2007 | Hamel et al. | |
| 7,256,505 | B2 | * | 8/2007 | Arms et al. | 290/1 R |
| 7,361,998 | B2 | | 4/2008 | Hamel et al. | |
| 7,429,805 | B2 | * | 9/2008 | Hamel et al. | 307/9.1 |
| 7,567,013 | B2 | * | 7/2009 | Lu et al. | 310/319 |
| 2008/0036617 | A1 | * | 2/2008 | Arms et al. | 340/679 |
| 2008/0252174 | A1 | * | 10/2008 | Mohammadi et al. | 310/319 |
| 2009/0174361 | A1 | | 7/2009 | Duron et al. | |
| 2010/0045241 | A1 | | 2/2010 | Nousiainen | |
| 2010/0060231 | A1 | | 3/2010 | Trainor et al. | |
| 2010/0141094 | A1 | * | 6/2010 | Lee et al. | 310/339 |
| 2010/0219721 | A1 | * | 9/2010 | Namuduri et al. | 310/339 |
| 2010/0288046 | A1 | * | 11/2010 | Sy et al. | 73/488 |
| 2010/0317978 | A1 | * | 12/2010 | Maile et al. | 600/488 |

* cited by examiner

*Primary Examiner* — Mark Budd
(74) *Attorney, Agent, or Firm* — Armstrong Teasdale LLP

(57) ABSTRACT

A sensor assembly includes a transducer and a control module coupled with the transducer. The control module is configured to selectively switch the sensor assembly between a first mode of operation wherein the sensor assembly measures an amount of energy induced to the sensor assembly, and a second mode of operation wherein the sensor assembly stores an amount of energy induced to the sensor assembly.

18 Claims, 2 Drawing Sheets

SYSTEMS AND APPARATUS FOR HARVESTING ENERGY

BACKGROUND OF THE INVENTION

The present application relates generally to power generation systems and, more particularly, to systems and apparatus for use in harvesting energy.

At least some known monitoring systems include at least one sensor that detects and/or measures the operating conditions of a machine. Generally, known sensors are powered by an external power supply and/or by an internal battery. To conserve power, the sensors may be deactivated when measurements are not needed, such as when the machine is not operating. When measurements are desired, the sensors may be activated to record measurements from the machine. Once the sensors have completed recording the measurements, the sensors are typically deactivated again to conserve power. However, because of a desire to conserve power, the sensors may record or measure operating characteristics of the machine at infrequent intervals. One problem that may occur with using such practices is that the sensors may not generate a robust measurement dataset for the machine.

To provide additional power for the monitoring system, at least some known monitoring systems harvest energy from a monitored machine. For example, known piezoelectric devices may be used to harvest energy from vibrations generated by the machine. The harvested energy is often stored in a battery for use in powering sensors or other devices within the monitoring system. However, the use of additional harvesting devices within the monitoring system may increase the cost and/or complexity of the monitoring system to a level that the benefits gained from such monitoring systems is offset or outweighed.

BRIEF DESCRIPTION OF THE INVENTION

In one embodiment, a sensor assembly is provided that includes a transducer and a control module coupled with the transducer. The control module is configured to selectively switch the sensor assembly between a first mode of operation wherein the sensor assembly measures an amount of energy induced to the sensor assembly, and a second mode of operation wherein the sensor assembly stores an amount of energy induced to the sensor assembly.

In another embodiment, a monitoring system is provided that includes at least one sensor assembly including a transducer. The monitoring system also includes at least one sensor node coupled with the sensor assembly. A control module is coupled with the transducer and is configured to selectively switch the sensor assembly between a first mode of operation wherein the sensor assembly measures an amount of energy induced to the sensor assembly, and a second mode of operation wherein the sensor assembly stores an amount of energy induced to the sensor assembly.

In another embodiment, a sensor assembly for use in detecting and harvesting vibrations within a machine is provided that includes a transducer configured to generate a signal representative of an amount of vibrational energy detected within the sensor assembly. The sensor assembly also includes a control module coupled with the transducer. The control module is configured to selectively switch the sensor assembly between a sensing mode of operation and an energy harvesting mode of operation. The sensor assembly also includes a storage device coupled with the control module. The control module is further configured to transmit the signal to a sensor node when the sensor assembly is operating in the sensing mode, and to transmit the signal to the storage device when the sensor assembly is operating in the energy harvesting mode.

DETAILED DESCRIPTION OF THE INVENTION

Figure 1:
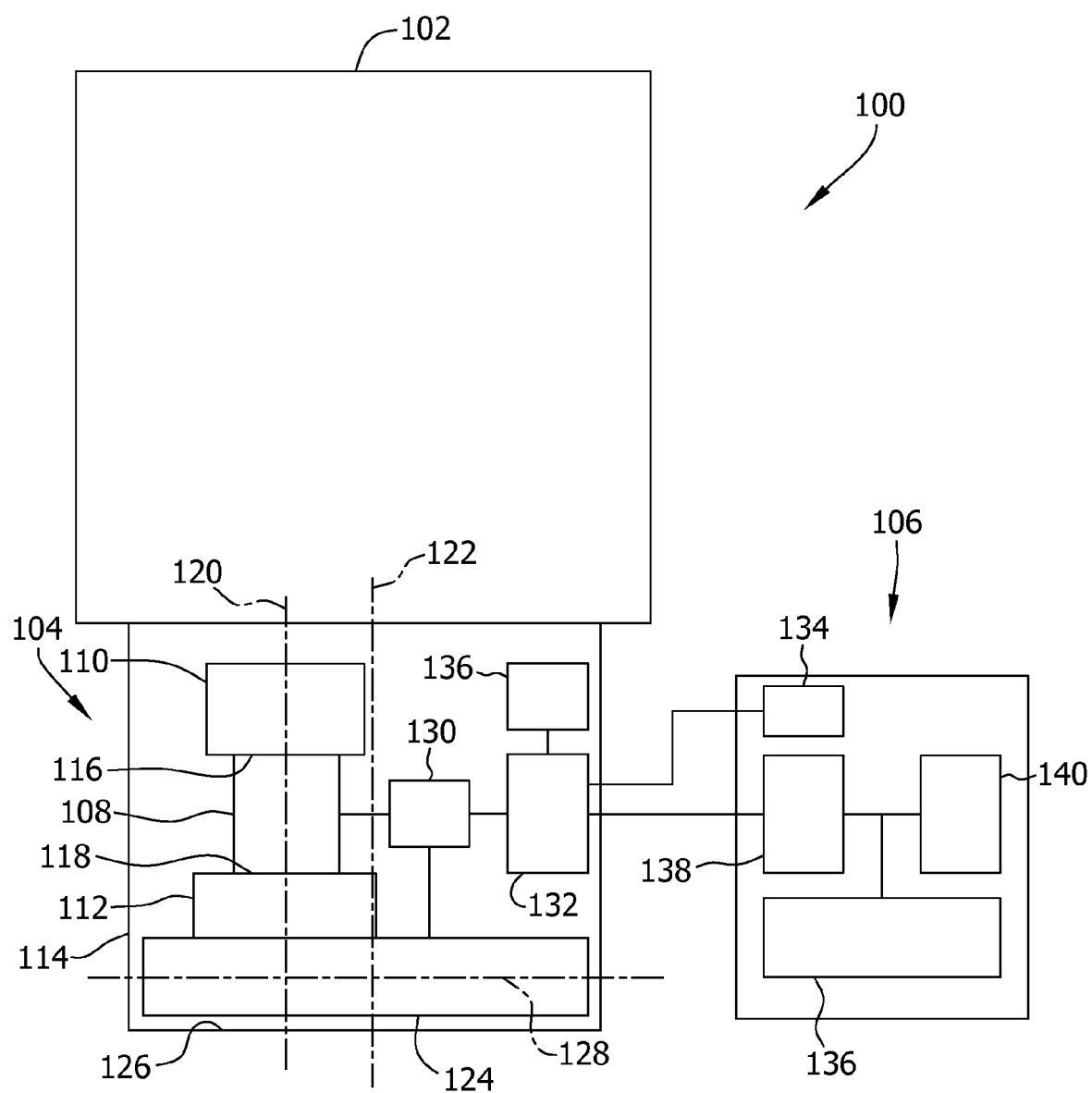
FIG. 1 is a block diagram of an exemplary monitoring system that may be used in monitoring a machine.

FIG. 1 illustrates a portion of an exemplary monitoring system 100 that may be used in monitoring a machine 102. In the exemplary embodiment, monitoring system 100 includes at least one sensor assembly 104 that is coupled to machine 102. Moreover, in the exemplary embodiment, monitoring system 100 includes at least one sensor node 106 that is coupled to any suitable number of sensor assemblies 104 that enables monitoring system 100 to operate as described herein. In the exemplary embodiment, monitoring system 100 detects and/or measures at least one operating condition of machine 102. As used herein, the term "couple" is not limited to a direct mechanical and/or electrical connection between components, but may also include an indirect mechanical and/or electrical connection between components.

In the exemplary embodiment, each sensor assembly 104 selectively harvests energy from machine 102 and detects and/or measures at least one operating condition of machine 102. For example, sensor assembly 104 may detect and/or measure a vibration, a rotational speed, a temperature, and/or any other suitable operating condition of machine 102 that enables monitoring system 100 to operate as described herein. As used herein, the term "harvest energy" refers to the practice of converting at least a portion of energy received by sensor assembly 104 into electrical energy. For example, sensor assembly 104 may convert energy including, without limitation, vibrational energy, kinetic energy, elastic potential energy, and/or any other suitable type of energy that enables sensor assembly 104 to generate electrical energy therefrom.

In the exemplary embodiment, each sensor assembly 104 includes a transducer 108, a mass 110 that is coupled to transducer 108, and a base 112 that is coupled to transducer 108. Mass 110, base 112, and transducer 108 are each positioned within a housing 114. In the exemplary embodiment, transducer 108 includes a first surface 116 and an opposite second surface 118 that each extend substantially perpendicular to a centerline 120 extending through transducer 108. Alternatively, first and second surfaces 116 and 118 may be oriented in any suitable position with respect to centerline 120 that enables sensor assembly 104 to operate as described herein. In the exemplary embodiment, mass 110 is coupled to first surface 116 and base 112 is coupled to second surface 118. Mass 110 facilitates increasing a force of axial vibrations induced to transducer 108 during operation of machine 102, as compared to known sensor assemblies (not shown) that do not include mass 110. In the exemplary embodiment, base 112 is substantially rigid, and base 112 facilitates compressing transducer 108 when mass 110 is shifted via gravity towards transducer 108, by vibrational forces induced to sensor assembly 104, and/or by any other suitable force that causes mass 110 to move towards transducer 108. Alternatively, transducer 108, mass 110, and base 112 may be positioned such that shear forces may be induced to transducer 108.

Transducer 108, in the exemplary embodiment, is oriented substantially parallel to a centerline 122 extending through sensor assembly 104. As such, transducer 108 is positioned to detect and/or to measure vibrational energy induced generally axially through sensor assembly 104 (hereinafter referred to as "axial vibrations"). Moreover, transducer 108 converts energy from axial vibrations into electrical energy. In the exemplary embodiment, sensor assembly 104 also includes a secondary transducer 124 that is positioned between base 112 and a bottom surface 126 of housing 114. Secondary transducer 124 is oriented such that its longitudinal axis 128 is substantially perpendicular to transducer centerline 120. Secondary transducer 124 detects and/or measures axial vibrations and/or vibrational energy induced generally transversely through sensor assembly 104 (hereinafter referred to as "transverse vibrations") relative to centerline 120. Moreover, secondary transducer converts energy from axial vibrations and/or transverse vibrations into electrical energy. As used herein, the term "axial" refers to a direction substantially parallel to centerline 122, and the term "transverse" refers to a direction substantially perpendicular to and/or oblique with respect to centerline 122.

In the exemplary embodiment, transducer 108 and secondary transducer 124 are each fabricated from a piezoelectric material, such as a crystal, a ceramic compound such as lead zirconate titanate, and/or any other piezoelectric material that enables transducers 108 and 124 to operate as described herein. Alternatively, transducer 108 and/or secondary transducer 124 may be a moving coil sensor and/or may be fabricated from any other material that enables transducer 108 and/or secondary transducer 124 to operate as described herein.

In the exemplary embodiment, sensor assembly 104 also includes a signal conditioning module 130 that is coupled to transducer 108, and a control module 132 that is coupled to signal conditioning module 130. In an alternative embodiment, either signal conditioning module 130 and/or control module 132 is positioned within a remote system, such as within sensor node 106. In the exemplary embodiment, signal conditioning module 130 receives a charge proportional to the amount of detected vibrations within sensor assembly 104 (hereinafter referred to as a "vibration signal") from transducer 108. Signal conditioning module 130 may also rectify the vibration signal, synchronously switch the vibration signal, and/or amplify and/or regulate a voltage level of the vibration signal received from transducer 108. Moreover, signal conditioning module may convert the vibration signal from an alternating current (AC) signal to a direct current (DC) signal. Signal conditioning module 130 transmits the conditioned vibration signal to control module 132.

Control module 132, in the exemplary embodiment, receives a control signal from a controller 134 coupled to sensor assembly 104. More specifically, in the exemplary embodiment, controller 134 is positioned within sensor node 106. Alternatively, controller 134 may be positioned within sensor assembly 104, within a remote device (not shown), or within any suitable component of monitoring system 100 that enables monitoring system 100 to operate as described herein. Control module 132 selectively switches sensor assembly 104 between a first or sensing, mode of operation, and a second or harvesting, mode of operation based on the control signal. Alternatively, control module 132 may generate an internal control signal and/or use circuitry (not shown) within control module 132 to selectively switch sensor assembly 104 between the sensing mode and the harvesting mode. Moreover, in the exemplary embodiment, control module 132 is coupled to signal conditioning module 130. Alternatively, the functionality of signal conditioning module 130 is incorporated within control module 132.

In the exemplary embodiment, controller 134 includes a processor that controls an operation of sensor assembly 104, sensor node 106, and/or monitoring system 100. As used herein, the term "processor" is not limited to just those integrated circuits referred to in the art as a computer, but broadly refers to a microcontroller, a microcomputer, a programmable logic controller (PLC), an application specific integrated circuit, and other programmable circuits, and these terms are used interchangeably herein.

Moreover, in the exemplary embodiment, in the sensing mode of operation, sensor assembly 104 functions as a vibration sensor. More specifically, control module 132 transmits the vibration signal received from transducer 108 to sensor node 106. The vibration signal transmitted is proportional to the detected vibrational energy induced to sensor assembly 104. Signal conditioning module 130 may condition the vibration signal as described above before the vibration signal is transmitted to sensor assembly 104. Sensor node 106 transmits the vibration signal to one or more remote devices (not shown) for additional processing, analysis, and/or display. Alternatively, the vibration signal may be stored within sensor assembly 104 and/or sensor node 106, and the vibration signal may be retrieved, processed, and/or transmitted at a predetermined time.

In the exemplary embodiment, during the harvesting mode of operation, sensor assembly 104 functions as a power harvesting device. More specifically, control module 132 transmits the vibration signal received from transducer 108 to a storage device 136 positioned in sensor assembly 104, in sensor node 106, and/or in any suitable device or system that enables monitoring system 100 to operate as described herein. Storage device 136 may include, but is not limited to only including, a battery, a capacitor, and/or any other suitable device that enables transducer 108 to store an electrical charge therein. During the harvesting mode of operation, the received vibration signal is also proportional to the detected vibrational energy induced to sensor assembly 104. Signal conditioning module 130 may condition the vibration signal as described above before the vibration signal is transmitted to storage device 136. However, in contrast to operation in the sensing mode, the signal is used in the harvesting mode to recharge and/or to maintain a desired energy level of storage device 136. In one embodiment, the signal may also be used to at least partially energize circuitry within sensor assembly 104, within sensor node 106, and/or within any other suitable component of monitoring system 100.

Controller 134, in the exemplary embodiment, selectively switches sensor assembly 104 from the sensing mode to the harvesting mode, and vice-versa. In one embodiment, controller 134 periodically switches sensor assembly 104 between modes, at predefined times, and/or after predefined criteria have been satisfied. For example, controller 134 may switch sensor assembly 104 from the harvesting mode to the sensing mode approximately every twelve hours, approximately every hour, and/or at any other suitable time period that enables monitoring system 100 to operate as described herein. In an alternative embodiment, controller 134 and/or control module 132 may receive a control signal from one or more components of sensor assembly 104 and/or sensor node 106 that indicates when sensor assembly 104 should switch modes of operation. For example, storage device 136 may transmit a control signal to controller 134 and/or to control module 132 when an energy level within storage device 136 reaches or exceeds a threshold value. In such an embodiment, sensor assembly 104 may be automatically switched from the harvesting mode to the sensing mode whenever storage device 136 has a charge sufficient to energize the circuitry within sensor assembly 104 and/or within sensor node 106. In yet another embodiment, a user may transmit a control signal to controller 134 and/or to control module 132 to switch sensor assembly 104 between the sensing mode and the harvesting mode.

Moreover, in one embodiment, controller 134 and/or control module 132 enable sensor assembly 104 to substantially dampen and/or to actively control one or more resonance vibrations within sensor assembly 104 and/or within machine 102. In such an embodiment, controller 134 and/or control module 132 transmits one or more signals to transducer 108 and/or to secondary transducer 124. Such signals selectively energize transducer 108 and/or secondary transducer 124 and thus cause an expansion and/or displacement of transducers 108 and/or 124. The expansion and/or displacement of transducers 108 and/or 124 may induce vibrations within sensor assembly 104 and/or within machine 102 that may be used to offset, dampen, and/or cancel other vibrations within sensor assembly 104 and/or within machine 102.

In the exemplary embodiment, monitoring system 100 includes at least one sensor node 106 that is coupled to at least one sensor assembly 104. In the exemplary embodiment, sensor node 106 includes a signal interface module 138, a communication module 140, and a storage device 136, such as a battery and/or a capacitor.

Sensor assembly 104, in the exemplary embodiment, is coupled to sensor node 106 via signal interface module 138. Signal interface module 138 receives vibration signals from transducer 108 and/or from control module 132. Signal interface module 138 may process the vibration signal received, for example, by filtering, rectifying, adjusting a voltage, and/or by adjusting any other suitable characteristic of the signal that enables monitoring system 100 to operate as described herein. Post processing, signal interface module 138 transmits the processed vibration signal to communication module 140.

In the exemplary embodiment, sensor node 106 communicates with other sensor nodes 106 and/or with a remote monitoring device (not shown) via communication module 140. In the exemplary embodiment, communication module 140 includes a wireless transceiver that enables communication with other sensor nodes 106 and/or with the remote monitoring device via any suitable wireless communication protocol and/or mechanism. In one embodiment, sensor nodes 106 form a mesh network with other sensor nodes 106 and/or with the remote monitoring device. Alternatively, sensor nodes 106 and/or the remote monitoring device form any other suitable network that enables monitoring system 100 to operate as described herein. Communication module 140 receives processed vibration signals from signal interface module 138 and transmits the signals to other sensor nodes 106 and/or to the remote monitoring device for further processing, display, and/or analysis.

During operation, vibrations from machine 102 are induced into sensor assembly 104. Transducer 108 and/or secondary transducer 124 converts energy from axial and/or transverse vibrations into electrical energy. Transducer 108 transmits the electrical energy to signal conditioning module 130. Secondary transducer 124 transmits the electrical energy to storage device 136. Alternatively, secondary transducer 124 may transmit the electrical energy to a signal conditioning module 130 via a vibration signal.

Signal conditioning module 130 conditions the vibration signal, such as by filtering, rectifying, synchronously switching, regulating, and/or adjusting a voltage level of the signal.

The conditioned vibration signal is then transmitted to control module 132 and control module 132 selectively transmits the signal to storage device 136 or to sensor node 106. For example, in the exemplary embodiment, control module 132 generally transmits the conditioned vibration signal to storage device 136, and switches the signal to be channeled to sensor node 106 only at pre-determined times. In other words, control module 132 generally causes sensor assembly 104 to operate in the harvesting mode to energize storage device 136. Control module 132 switches sensor assembly 104 to operate in the sensing mode at desired times to obtain vibration measurements and to transmit the vibration signal that is representative of one or more vibration measurements to sensor node 106.

Sensor node 106 receives the vibration signal via signal interface module 138 and may process the signal received, for example, by filtering, rectifying, adjusting a voltage, and/or by adjusting any other suitable characteristic of the signal. Signal interface module 138 transmits the processed vibration signal to communication module 140. Communication module 140 transmits the processed vibration signal to other sensor nodes 106 and/or to the remote monitoring device for further processing, display, and/or analysis.

As such, in the exemplary embodiment, sensor assembly 104 and/or sensor node 106 is optimized for detecting and harvesting energy from vibrations induced to sensor assembly 104. More specifically, a single transducer 108 may be used to generate a vibration signal that enables control module 132 to selectively recharge storage device 136 and/or to transmit the signal that is representative of one or more vibration measurements to sensor node 106 and/or to the remote monitoring device. Sensor assembly 104 and/or sensor node 106 facilitate providing an efficient and cost-effective combination of vibration sensing and energy harvesting within monitoring system 100.

Figure 2:
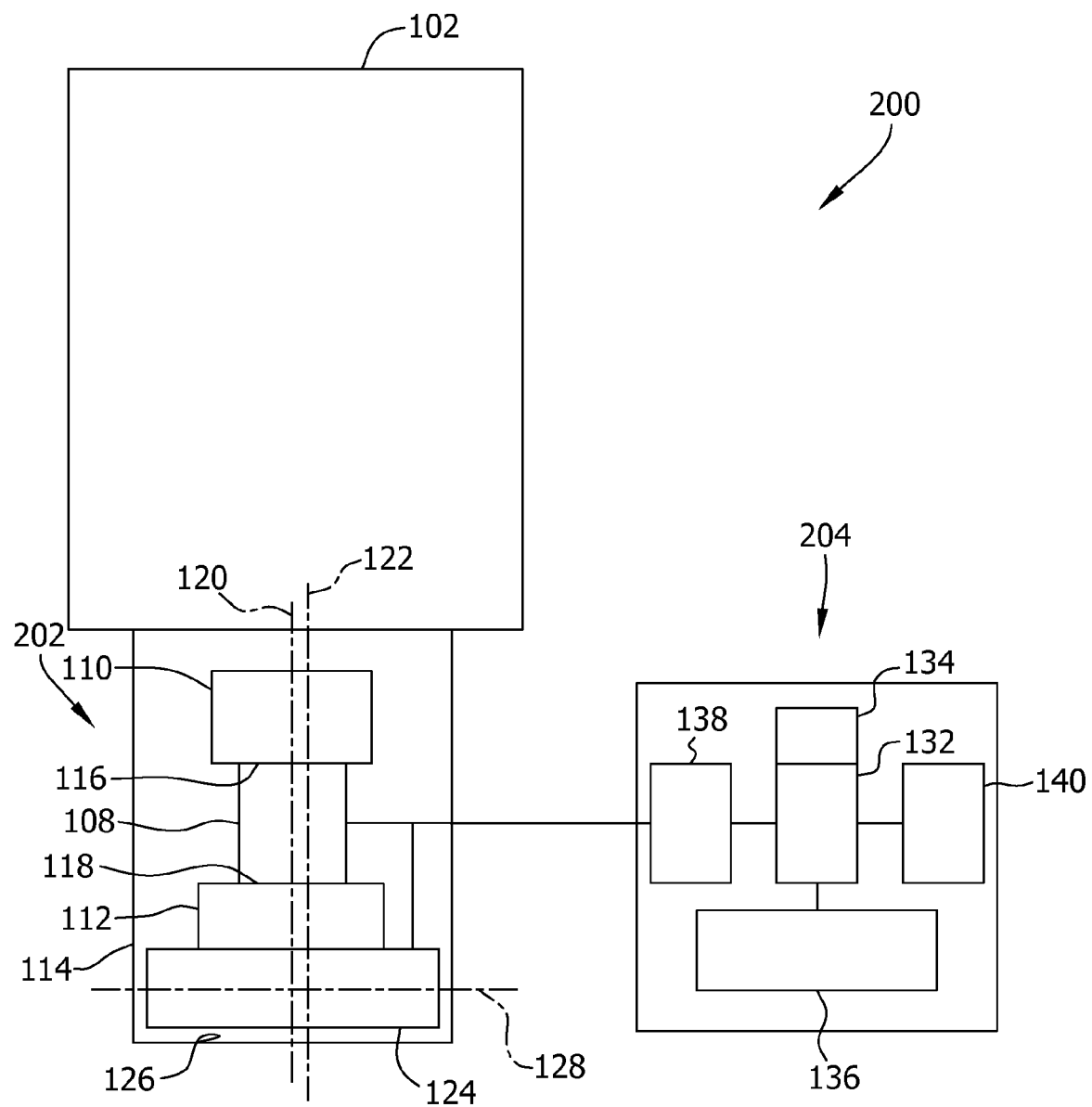
FIG. 2 is a block diagram of an alternative monitoring system that may be used in monitoring a machine.

FIG. 2 illustrates an alternative monitoring system 200 that may be used to monitor machine 102. Except as otherwise specified herein, monitoring system 200 is similar to monitoring system 100 (shown in FIG. 1), and similar components are labeled with the same reference numerals. In the exemplary embodiment, monitoring system 200 includes at least one sensor assembly 202 that is coupled to machine 102, and at least one sensor node 204 that is coupled to sensor assembly 202.

Sensor assembly 202 is substantially similar to sensor assembly 104 (shown in FIG. 1) except that signal conditioning module 130, control module 132, and/or storage device 136 are housed within sensor node 204, rather than being housed in sensor assembly 202. As such, in the exemplary embodiment, transducer 108 and/or secondary transducer 124 transmit a "raw" (i.e., an unprocessed and unconditioned) electrical signal to sensor node 204. The signal is representative of a detected amount of vibrational energy within sensor assembly 202. Sensor node 204 receives the raw signal within signal interface module 138. In the alternative embodiment, the functionality of signal conditioning module 130 is incorporated within signal interface module 138 and/or within control module 132. As such, signal interface module 138 conditions and/or processes the raw signal as described above.

In the exemplary embodiment, control module 132 and/or controller 134 are housed within sensor node 204. Control module 132 is coupled to signal interface module 138, to storage device 136, to communication module 140, and to controller 134. Signal interface module 138 transmits the conditioned and/or processed signal to control module 132. Control module 132 and/or controller 134 selectively transmits the signal to storage device 136 or to communication module 140 in a similar manner as described above with reference to FIG. 1. The signal is transmitted to storage device 136 to facilitate recharging and/or to enable a desired energy level of storage device 136 to be maintained. When communication module 140 receives the signal, communication module 140 transmits the signal to other sensor nodes 204 and/or to a remote monitoring device (not shown) for additional processing, display, and/or analysis.

As described herein, in the exemplary embodiment, sensor assembly 104 is optimized to detect and to harvest energy from vibrational energy induced to sensor assembly 104. More specifically, in contrast to known sensors, a single transducer 108 may be used to generate a vibration signal that enables control module 132 to selectively recharge storage device 136 and/or to transmit the signal that is representative of one or more vibration measurements to sensor node 106 and/or to the remote monitoring device. Moreover, because of the energy harvested during the harvesting mode of operation, sensor assembly 104 and/or sensor node 106 facilitates enhanced and increased measurement, an enhanced or optimized sampling rate, and/or a prolonged battery life, as compared to known sensors that only detect vibrational energy. Sensor assembly 104 and/or sensor node 106 may also facilitate reducing an amount of external power that sensor node 106, sensor assembly 104, and/or any other suitable component of monitoring system 100 may otherwise require.

The above-described embodiments provide an efficient and cost-effective monitoring system for use in monitoring a machine. The monitoring system described herein facilitates enabling a sensor assembly to selectively operate in a sensing mode and in an energy harvesting mode. During the sensing mode, the sensor assembly transmits a signal representative of a detected vibration amount within the sensor assembly to a sensor node. The sensor node transmits the signal to other sensor nodes or to a remote monitoring device for analysis, display, and/or processing. During the energy harvesting mode, the sensor assembly transmits the signal to a storage device for use in recharging or maintaining an energy level of the storage device. As such, the monitoring system enables an increased amount of energy to be harvested from a machine by the same transducer that measures the vibrations caused by the machine. The energy may be used to increase a data sampling rate of the sensor assembly and/or to energize one or more components of the monitoring system.

Exemplary embodiments of systems and apparatus for use in harvesting energy are described above in detail. The systems and apparatus are not limited to the specific embodiments described herein, but rather, components of the systems and/or apparatus may be utilized independently and separately from other components described herein. For example, the sensor assembly may also be used in combination with other measuring systems and methods, and is not limited to practice with only the monitoring system as described herein. Rather, the exemplary embodiment can be implemented and utilized in connection with many other power system applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A sensor assembly comprising:
a first transducer coupled to a machine and oriented with respect to a first axis, said first transducer configured to sense vibration energy of the machine with respect to the first axis and transmit a signal indicative of the sensed vibration energy;
a second transducer coupled to the machine and oriented with respect to a second axis that is different than the first axis, said second transducer configured to sense vibration energy of the machine with respect to the second axis and transmit a signal indicative of the sensed vibration along the second axis;
a control module coupled with said first transducer and said second transducer, said control module configured to selectively switch said sensor assembly between a first mode of operation wherein said sensor assembly measures an amount of vibration energy induced to said sensor assembly by the machine, and a second mode of operation wherein said sensor assembly stores an amount of energy induced to said sensor assembly; and
a power storage device coupled to said first transducer and to said second transducer for receiving electrical energy from said first transducer and said second transducer, said control module configured to switch said sensor assembly from the first mode of operation to the second mode of operation when an energy level of said power storage device is approximately equal to a predefined energy level.

2. A sensor assembly in accordance with claim 1, wherein said first transducer comprises at least one of a piezoelectric material and a moving coil sensor.

3. A sensor assembly in accordance with claim 1, wherein said first transducer is oriented substantially parallel to a centerline extending axially through said sensor assembly such that said first transducer at least one of detects and harvests energy from vibrations induced substantially parallel to the centerline.

4. A sensor assembly in accordance with claim 3, wherein said second transducer is configured to at least one of detect and harvest energy from vibrations induced substantially transverse to the centerline.

5. A sensor assembly in accordance with claim 1, further comprising a signal conditioning module coupled with said first transducer and configured to at least one of rectify, synchronously switch, regulate, adjust a voltage level of, and convert to direct current a signal received from said first transducer.

6. A monitoring system comprising:
at least one sensor assembly comprising:
a first transducer coupled to a machine and oriented with respect to a first axis, said first transducer configured to sense vibration energy of the machine with respect to the first axis and transmit a signal indicative of the sensed vibration energy along the first axis; and
a second transducer coupled to the machine and oriented with respect to a second axis that is different than the first axis, said second transducer configured to sense vibration energy with respect to the second axis and transmit a signal indicative of the sensed vibration energy along the second axis;

at least one sensor node coupled with said at least one sensor assembly;

a control module coupled with said first transducer and said second transducer, said control module configured to selectively switch said at least one sensor assembly between a first mode of operation wherein said at least one sensor assembly measures an amount of vibration energy induced to said at least one sensor assembly by the machine, and a second mode of operation wherein said at least one sensor assembly stores an amount of energy induced to said at least one sensor assembly; and a power storage device positioned within at least one of said at least one sensor node and said at least one sensor assembly, said control module configured to switch said at least one sensor assembly from the first mode of operation to the second mode of operation when an energy level of said power storage device is approximately equal to a predefined energy level.

7. A monitoring system in accordance with claim 6, wherein said at least one sensor node comprises a communication module configured to:

receive a signal from said first transducer when said at least one sensor assembly is operating in the first mode; and transmit the signal to a remote system.

8. A monitoring system in accordance with claim 6, wherein said power storage device is configured to receive a signal from said first transducer when said at least one sensor assembly is operating in the second mode.

9. A monitoring system in accordance with claim 6, wherein said first transducer comprises at least one of a piezoelectric material and a moving coil sensor.

10. A monitoring system in accordance with claim 6, wherein said first transducer is oriented substantially parallel to a centerline extending axially through said at least one sensor assembly such that said first transducer at least one of detects and harvests energy from vibrations induced substantially parallel to the centerline.

11. A monitoring system in accordance with claim 10, wherein said second transducer is configured to at least one of detect and harvest energy from vibrations induced at least one of substantially transverse to the centerline.

12. A monitoring system in accordance with claim 6, further comprising a signal conditioning module coupled with said first transducer and configured to at least one of rectify, synchronously switch, regulate, adjust a voltage level of, and convert to direct current a signal received from said first transducer.

13. A sensor assembly for use in detecting and harvesting vibrations within a machine, said sensor assembly comprising:

a first transducer coupled to a machine and oriented with respect to a first axis, said first transducer configured to sense vibration energy of the machine with respect to said first axis and transmit a first signal representative of an amount of vibrational energy induced to said sensor assembly by the machine;

a second transducer coupled to the machine and oriented with respect to a second axis that is different than said first axis, said second transducer configured to sense vibration energy with respect to the second axis and transmit a second signal representative of an amount of vibrational energy induced to said sensor assembly along said second axis;

a control module coupled with said first transducer and said second transducer, said control module configured to selectively switch said sensor assembly between a sensing mode of operation and an energy harvesting mode of operation; and a power storage device coupled with said control module, said control module further configured to:

transmit the first signal and the second signal to a sensor node when said sensor assembly is operating in the sensing mode;

transmit the first signal and the second signal to said power storage device when said sensor assembly is operating in the energy harvesting mode; and switch said sensor assembly from the energy harvesting mode to the sensing mode when an energy level of said power storage device is approximately equal to a predefined energy level.

14. A sensor assembly in accordance with claim 13, further comprising a signal conditioning module coupled with said first transducer and configured to at least one of rectify, synchronously switch, regulate, adjust a voltage level of, and convert to direct current the signal received from said first transducer.

15. A sensor assembly in accordance with claim 13, wherein said first transducer comprises at least one of a piezoelectric material and a moving coil sensor.

16. A sensor assembly in accordance with claim 13, wherein said second transducer comprises a piezoelectric material.

17. A sensor assembly in accordance with claim 13, wherein said first transducer is oriented substantially parallel to a centerline extending axially through said sensor assembly such that said first transducer at least one of detects and harvests energy from vibrations induced substantially parallel to the centerline.

18. A sensor assembly in accordance with claim 17, wherein said second transducer is configured to at least one of detect and harvest energy from vibrations induced substantially transverse to the centerline.

* * * * *